(12) United States Patent
Kristinsson et al.

(10) Patent No.: US 8,768,616 B2
(45) Date of Patent: Jul. 1, 2014

(54) ADAPTIVE METHOD FOR TRIP PREDICTION

(75) Inventors: Johannes Geir Kristinsson, Ann Arbor, MI (US); Ryan Abraham McGee, Ann Arbor, MI (US); Hai Yu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 13/345,997

(22) Filed: Jan. 9, 2012

(65) Prior Publication Data

US 2013/0179070 A1    Jul. 11, 2013

(51) Int. Cl.
    *G01C 21/34*    (2006.01)
(52) U.S. Cl.
    USPC .......................................... 701/467; 701/424
(58) Field of Classification Search
    None
    See application file for complete search history.

(56) References Cited

U.S. PATENT DOCUMENTS

| | | | | |
|---|---|---|---|---|
| 6,810,326 B1* | 10/2004 | Kawasaki | ..................... | 701/410 |
| 7,233,861 B2* | 6/2007 | Van Buer et al. | .............. | 701/424 |
| 7,419,095 B2* | 9/2008 | Yoshioka et al. | ............. | 235/384 |
| 7,565,155 B2* | 7/2009 | Sheha et al. | ............... | 455/456.1 |
| 7,630,828 B2* | 12/2009 | Tajima et al. | ................. | 701/118 |
| 7,788,027 B2* | 8/2010 | Jones | ............................. | 701/519 |
| 7,831,384 B2* | 11/2010 | Bill | .............................. | 701/423 |
| 7,835,859 B2* | 11/2010 | Bill | .............................. | 701/424 |
| 7,881,730 B2* | 2/2011 | Sheha et al. | ............... | 455/456.1 |
| 8,068,977 B2* | 11/2011 | Ozawa et al. | ................. | 701/465 |
| 8,073,615 B2* | 12/2011 | Kudoh et al. | ................. | 701/426 |
| 8,095,152 B2* | 1/2012 | Sheha et al. | ............... | 455/456.1 |
| 8,126,641 B2* | 2/2012 | Horvitz | ........................ | 701/414 |
| 8,200,425 B2* | 6/2012 | Overgoor et al. | ............ | 701/410 |
| 8,392,116 B2* | 3/2013 | Lehmann et al. | ............ | 701/524 |
| 8,412,445 B2* | 4/2013 | Uyeki | .......................... | 701/117 |
| 8,498,809 B2* | 7/2013 | Bill | .............................. | 701/423 |
| 2007/0150174 A1* | 6/2007 | Seymour et al. | ............. | 701/200 |
| 2010/0036601 A1* | 2/2010 | Ozawa et al. | ................ | 701/201 |
| 2010/0106603 A1* | 4/2010 | Dey et al. | ................... | 705/14.63 |
| 2013/0103300 A1* | 4/2013 | Rakthanmanon et al. | .... | 701/408 |
| 2013/0166096 A1* | 6/2013 | Jotanovic | ........................ | 701/1 |
| 2013/0173150 A1* | 7/2013 | Ghisio | .......................... | 701/423 |

\* cited by examiner

*Primary Examiner* — Khoi Tran
*Assistant Examiner* — Robert Nguyen
(74) *Attorney, Agent, or Firm* — Frank MacKenzie; Price Heneveld LLP

(57) ABSTRACT

A method for predicting a final destination of a vehicle comprises the steps of acquiring a start location of the vehicle, providing a predetermined waypoint distance from the start location, determining a current waypoint location once the vehicle travels the predetermined waypoint distance, receiving historical destination data from a database, including previous destinations associated with the current waypoint location. Then, making a prediction at the current waypoint location of the final destination based on the historical destination data.

20 Claims, 12 Drawing Sheets

ADAPTIVE METHOD FOR TRIP PREDICTION

FIELD OF THE INVENTION

The present invention generally relates to navigation systems for vehicles, and more particularly to a navigation system and method for predicting a final destination of the vehicle.

BACKGROUND OF THE INVENTION

Navigation systems are often included in automotive vehicles. These systems typically feature a display for displaying graphical data, such as a map illustrating the present position of the vehicle, and text data, such as the date, time, and other information pertinent to the vehicle and its location. Navigation systems are typically equipped with a processor, a global positioning system device (GPS), memory, and a user interface, and are capable of generating driving directions from the vehicle's current location to a selected destination, and can even suggest optimized routes to the destination if the navigation system also receives real time information, such as traffic and weather reports, etc.

Advanced energy management research projects have shown that it is possible to optimize vehicle performance, such as fuel economy and, in the case of electric vehicles, suggest a charge location, based on information about the intended destination of a trip. When the driver enters a destination into the navigation system, reliable and precise destination information is available for vehicle performance optimization. However, drivers frequently travel between often visited locations, such as work and home, and are not likely to need the use of the navigation system during such trips and therefore will not input a destination. In this case, the vehicle itself must be able to accurately predict the destination.

SUMMARY OF THE INVENTION

According to one aspect of the present invention, a method for predicting a final destination of a vehicle is provided. The method includes the steps of acquiring a start location of the vehicle, providing a predetermined waypoint distance from the start location, and determining a current waypoint location once the vehicle travels the predetermined waypoint distance. The method also includes the step of receiving historical destination data from a database, including previous destinations associated with the current waypoint location. The method further includes the step of making a prediction at the current waypoint location of the final destination based on the historical destination data.

According to another aspect of the present invention, a method for predicting a final driven distance of a vehicle to reach a final destination is provided. The method includes the steps of acquiring a start location of the vehicle, providing a predetermined waypoint distance from the start location, and determining a current waypoint location once the vehicle travels the predetermined waypoint distance. The method further includes the step of receiving historical driven distance data from a database, including previous driven distances associated with the current waypoint location. The method further includes the step of making a prediction at the current waypoint location of the final driven distance based on the historical driven distance data.

According to yet another aspect of the present invention, a navigation system for predicting at least one of a final destination and a final driven distance is provided. The system includes a global positioning system device, a database for storing historical data and predetermined waypoint distance information, and a microprocessor in communication with the global positioning system device and the database. The microprocessor acquires a start location of the vehicle from the global positioning system device, acquires a predetermined waypoint distance from the database, determines a current waypoint location once the vehicle has traveled the predetermined waypoint distance, and receives the historical destination and driven distance data from the database. The data includes previous destinations and driven distances associated with the current waypoint location. At the current waypoint location, the microprocessor makes a prediction of at least one of the final destination and the final driven distance, based on the historical destination and driven distance data.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
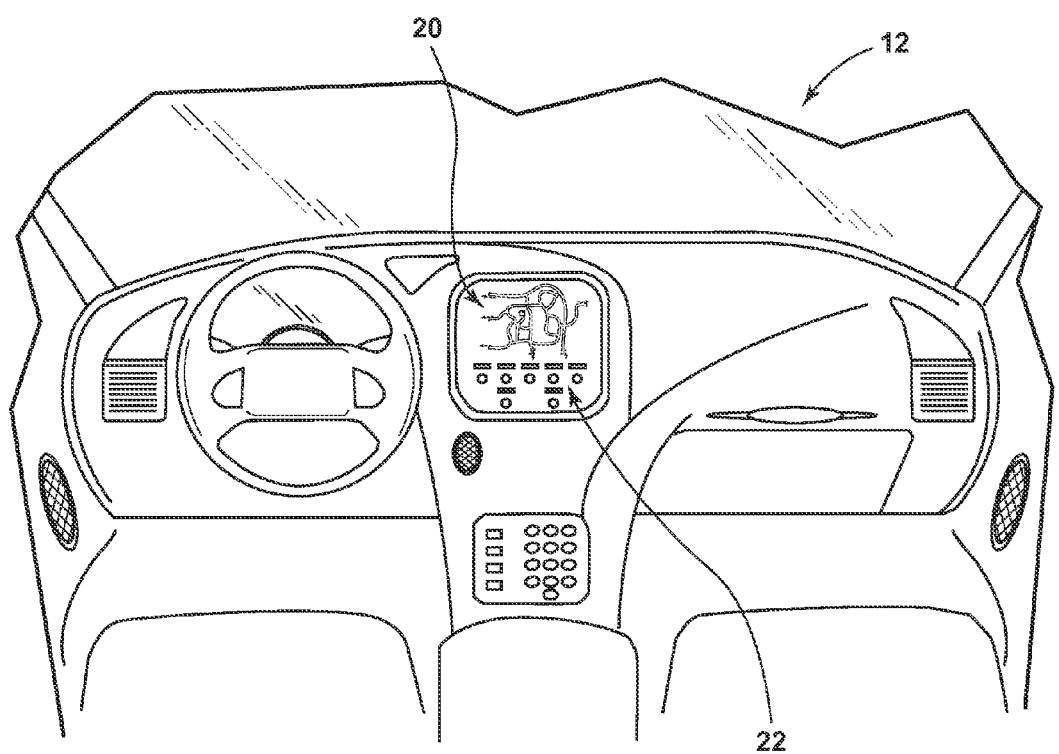
FIG. 1 is a front view of a cockpit of a vehicle equipped with a navigation system according to one embodiment.

For purposes of description herein, the terms "upper," "lower," "right," "left," "rear," "front," "vertical," "horizontal," "inboard," "outboard," and derivatives thereof shall relate to the vehicle as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
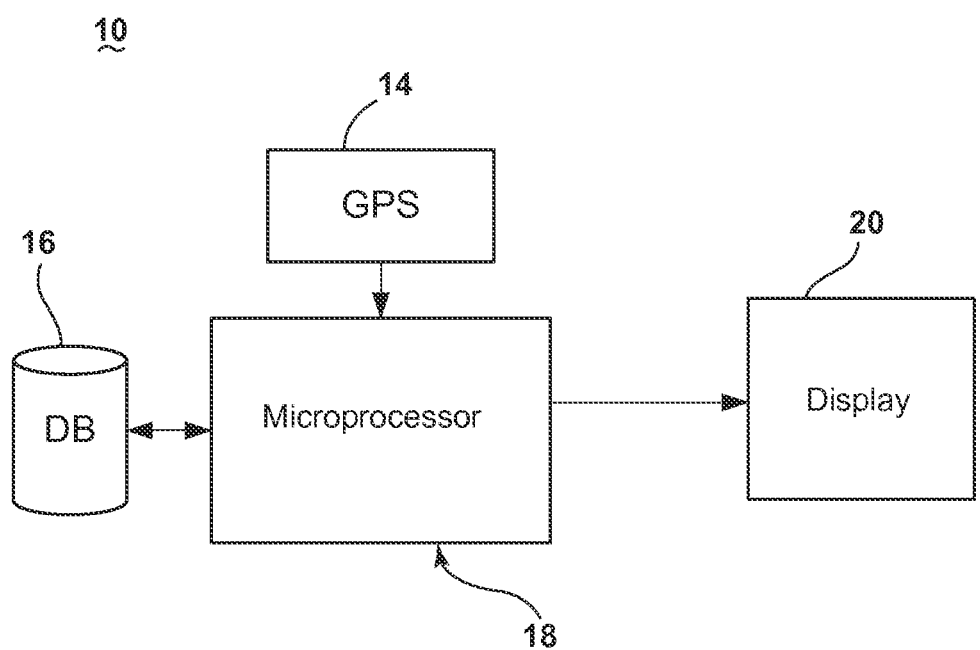
FIG. 2 is block diagram illustrating the navigation system.

FIGS. 1 and 2 illustrate a navigation system 10 installed in a vehicle 12 for predicting a final Destination (D) and/or a final Driven Distance (DD) of the vehicle 12. The vehicle 12 is shown and described herein as a wheeled motor vehicle for travel on roadways, however, it should be appreciated that the navigation system 10 may be employed on other vehicles 12. The navigation system 10 comprises a global positioning system device (GPS) 14, a database 16 for storing historical data and predetermined Waypoint Distance ($W_d$) information, and a microprocessor 18 in communication with the GPS 14 and the database 16. The database 16 generally includes memory for storing data. The microprocessor 18 or other control circuitry processes the data and one or more routines to perform steps of the method. The navigation system 10 may also include a display 20 for displaying the geographic location of the vehicle 12 and graphical data, such as a map. The navigation system 10 further has a user interface 22, which may be in the form of a touch screen. The database 16 may reside in the vehicle 12, or may be located remotely from the vehicle 12. The GPS 14, microprocessor 18, and database 16, are in electronic communication with one another, and may be wired or in wireless electronic communication.

The GPS 14 acquires and communicates the current geographic location of the vehicle 12. GPS 14 is widely used to provide highly accurate positional information using satellite signals. The database 16 provides historical information based on previous travel routes or trips to the navigation system 10. A travel route or trip can be defined as the time or Driven Distance (DD) between the Start (S) location, whether it be Home (H), Work (W), or some other location, and the final Destination (D). Further, the information related to each trip may include parameters (p) relative to the trip such as a DATE, TIME of day, DAY of the week, time of YEAR, and number of PASSENGERS. Thus, based on prior trips, the historical information stored in the database 16 includes geographic location data for locations including Home (H), Work (W), Start (S), and all previously visited final Destinations (D) and Waypoint (WP) locations. Each Waypoint (WP) location is defined as a point set a predetermined distance from the Start (S) location, and each Start (S) location has a number of Waypoint (WP) locations associated therewith. Further, each Waypoint (WP) location has a plurality of final Destinations (D) associated therewith. Thus, for each Start (S) location, the historical data stored in the database 16 includes all possible final Destinations (D) and corresponding Waypoint (WP) locations. Accordingly, each combination of Start (S) location, Waypoint (WP) location, and final Destination (D) contains a unique dataset.

Figure 3:
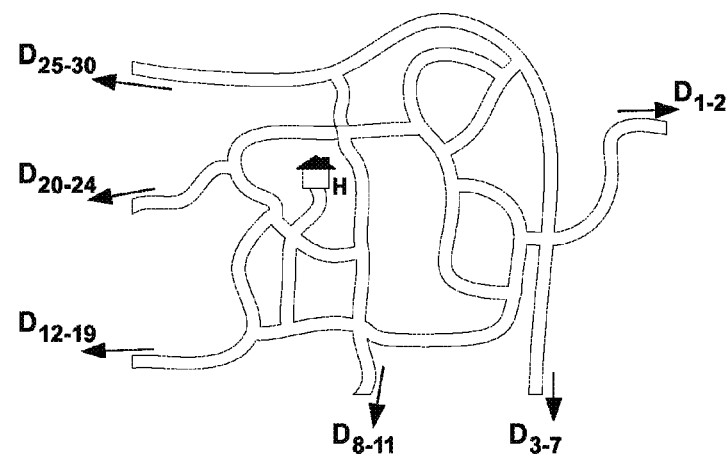
FIG. 3 is a schematic representation of a map with travel routes, including a home location and a plurality of possible destinations.
Figure 4:
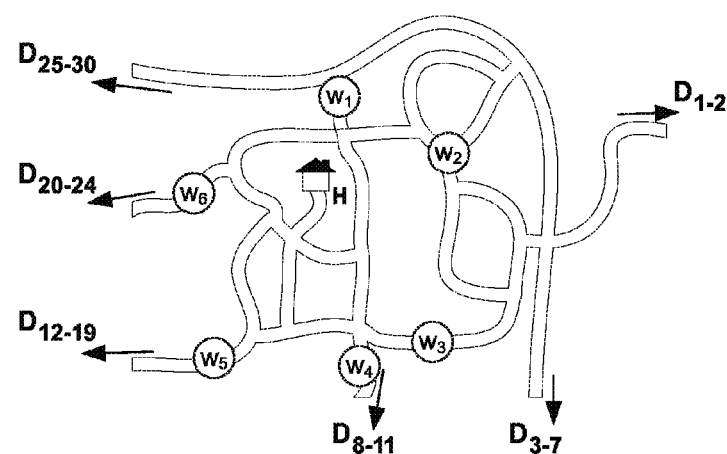
FIG. 4 is the schematic representation of a map with travel routes, including a plurality of waypoint locations.

Referring to the example illustrated in FIGS. 3 and 4, the location Home (H) may have six Waypoint ($WP_{1-6}$) locations associated therewith, each Waypoint ($WP_{1-6}$) location is located the same predetermined Waypoint Distance ($W_d$) from Home (H). The Waypoint ($WP_{1-6}$) locations may have multiple final Destinations ($D_{1-30}$) associated therewith.

Figure 5:
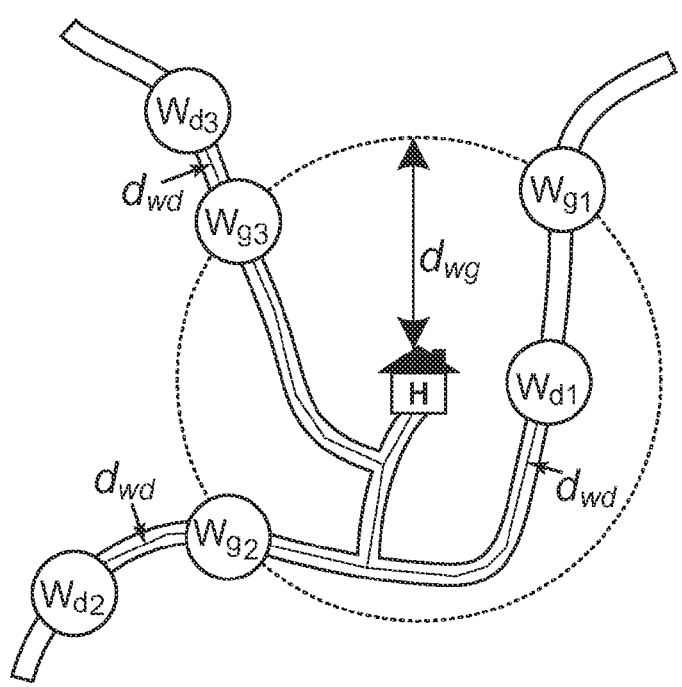
FIG. 5 is a graphical representation illustrating linear geographical distance and driven distance from an exemplary location.

It should be noted that distance can be measured in terms of the linear geographic distance between two locations, or as the road distance driven or travelled between two locations. The difference between these two distances is clearly illustrated in FIG. 5. Waypoint ($W_{g1}$-$W_{g3}$) locations are all located at an equal geographic distance ($d_{wg}$) from Home (H), however the distance to drive on the different roadway paths to each of these Waypoint ($W_{g1}$-$W_{g3}$) locations varies. Conversely, Waypoint ($W_{dd1}$-$W_{dd3}$) locations are all located at an equal driven distance ($d_{wd}$) from Home (H), however the geographic distance to Home (H) varies. For purposes of the present invention, either definition of distance can be used according to the embodiments.

Figure 6:
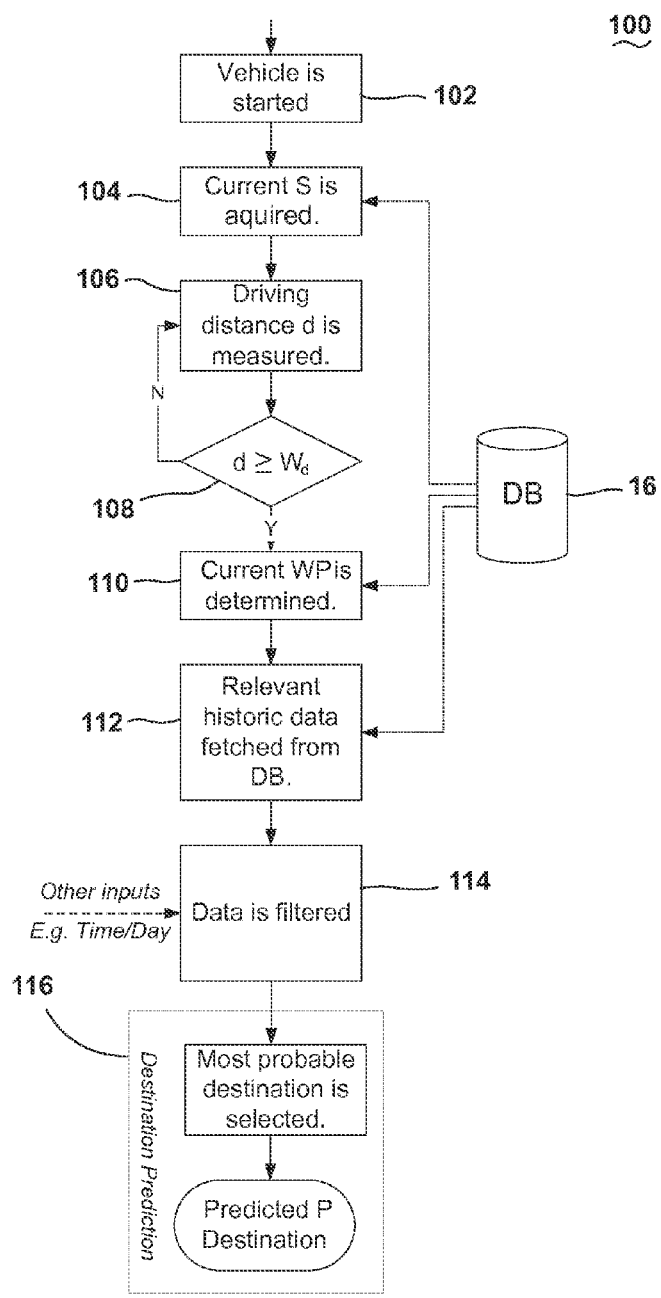
FIG. 6 is a flow diagram illustrating a method for predicting a final destination of the vehicle, according to one embodiment.

Utilizing the navigation system 10 described above, it is possible to predict the final destination (D) of the vehicle 12. According to one embodiment illustrated in FIG. 6, a method 100 for predicting the final Destination (D) of the vehicle 12 begins at step 102 with starting the vehicle 12 and proceeds to step 104 to acquire the Start (S) location of the vehicle 12 from the GPS 14. The method 100 continues to step 106, which measures a distance (d) the vehicle 12 is driven, and compares the driving distance (d), at step 108, to the predetermined primary Waypoint Distance ($W_d$), as provided by the database 16. When the Waypoint Distance ($W_d$) is equivalent to the measured driving distance (d), as determined in decision step 108, the method 100 proceeds to step 110, where the Waypoint (WP) location corresponding to the current location of the vehicle 12 is retrieved from the database 16.

The method 100 continues to step 112 by receiving relevant historical data related to the Waypoint (WP) location from the database 16. Optionally, at step 114, this unique dataset may also be filtered based on additional factors, such as the parameters (p) relative to the trip including DATE, TIME of day, DAY of the week, time of YEAR, and number of PASSENGERS, as mentioned above. The method 100 concludes at prediction step 116 by making a Prediction (P) of the final Destination (D) to select the most probable destination based on the historical data, be it filtered or unfiltered.

For example, referring back to FIG. 4, the vehicle 12 begins a trip at Home (H), from which the associated waypoint locations are Waypoint ($WP_{1-6}$) locations 1-6 and possible final destinations are final Destinations 1-30 ($D_{1-30}$). The Waypoint ($WP_{1-6}$) locations and final Destinations ($D_{1-30}$) are known to be associated with the Home (H) location through use of the historical data provided to the navigation system 10 by the database 16. Additionally, the Waypoint ($WP_{1-6}$) locations are located at the predetermined Waypoint Distance ($W_d$) from Home (H). The vehicle 12 leaves Home (H) and drives toward one of the Waypoint ($WP_{1-6}$) locations and final Destinations ($D_{1-30}$), and the distance (d) the vehicle 12 has driven is measured by the GPS 14. When the vehicle 12 drives a distance equal to the predetermined Waypoint Distance ($W_d$) it arrives at one of the Waypoint ($WP_{1-6}$) locations. The navigation system 10 then retrieves the unique data from the database 16 related to that particular Waypoint (WP) location. This unique data may also be filtered based on additional factors, such as the parameters (p), as described above. For example, if the current trip occurs on a Monday morning, historical parameters (p) can be filtered for data matching the same weekday and time of day. Using the unique data, filtered or unfiltered, the method 100 concludes by making a Prediction (P) of the final Destination (D) based on the historical data. It should be noted that this Prediction (P) does not occur immediately upon commencement of the trip, but is delayed until the vehicle 12 reaches the Waypoint (WP) location.

Figure 7:
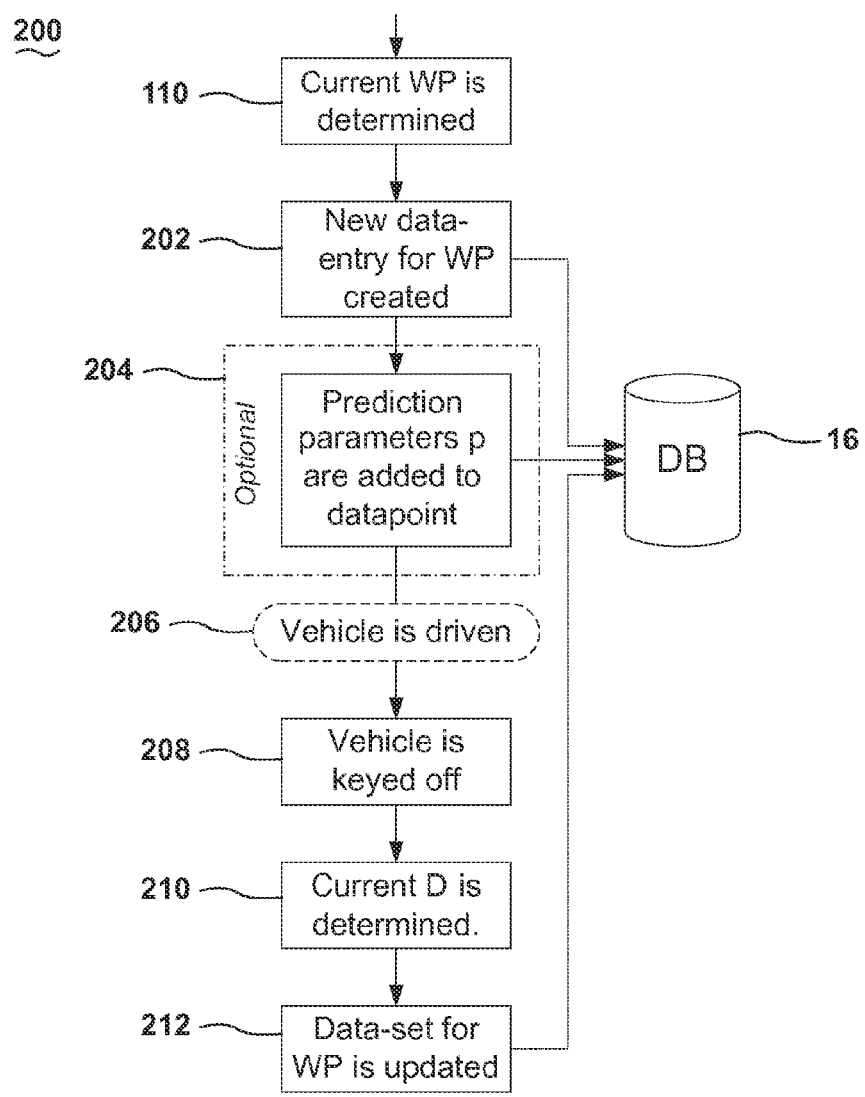
FIG. 7 is a flow diagram illustrating a method for updating data stored in a database of the navigation system of FIG. 2.

Referring now to FIG. 7, the process of updating the data stored in the database 16 is illustrated. An updating method 200 runs parallel to the method 100 and begins at step 110. As described above, at step 110 the vehicle 12 is determined to be at the current Waypoint (WP) location, and a new data entry for the current Waypoint (WP) location is created at step 202. At step 204, which is optional in one embodiment, corresponding parameters (p) relative to the new data entry at step 202 can be added to the database 16. Steps 206 and 208 are driving the vehicle 12 and turning the vehicle 12 off after having arrived at the final Destination (D). The current final Destination (D) is determined at step 210, and a new data entry for the final Destination (D) corresponding to the Waypoint (WP) location of step 110 is added to the dataset stored in the database 16 at step 212. Through the updating method 200, the database is continually updated such that the method 100 is able to better predict the final Destination (D), according to the driver's current driving habits.

Additionally, according to either of the above methods 100 or 200, when a current location, which is either the Start (S) location, Waypoint (WP) location, or final Destination (D), is not previously known to the database 16, a new location is added to the dataset stored in the database 16. Thus, the database 16 can be updated with new location information.

Figure 8:
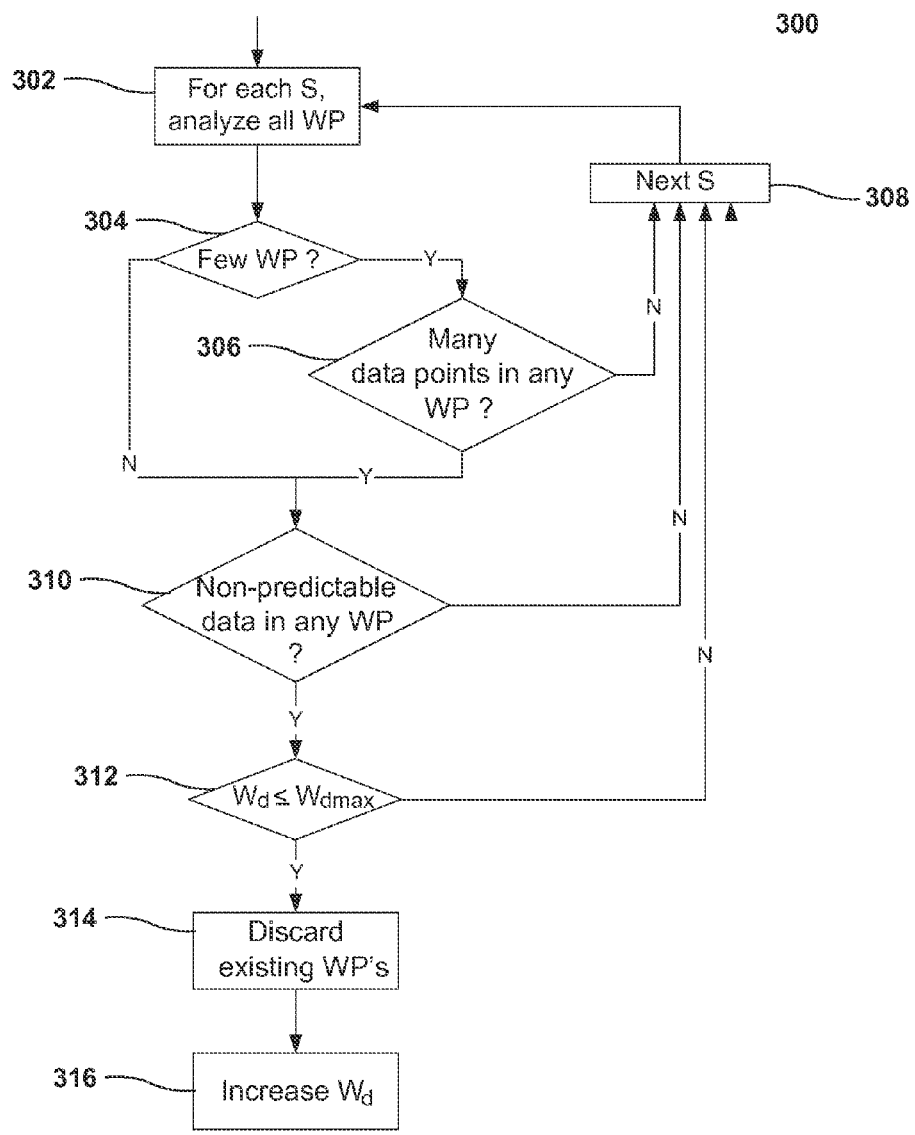
FIG. 8 is a flow diagram illustrating a method for determining an optimal waypoint distance to the waypoint location.

Referring now to FIG. 8, the process of optimizing the data used for the prediction method 100 is illustrated. The optimizing method 300 acts to determine an optimal Waypoint Distance ($W_d$) so as to be able to better predict the final Destination (D). It should be easily understood that as a vehicle 12 travels toward the final Destination (D) during any given trip, the accuracy of the Prediction (P) increases as the Waypoint Distance ($W_d$) increases. In other words, the closer a vehicle 12 gets to the final Destination (D), the more accurate the navigation system 10 is able to be when predicting the final Destination (D). However, at some distance from the Start (S) location, making a Prediction (P) is no longer valuable because the vehicle 12 is nearly to the final Destination (D).

The optimal Waypoint Distance ($W_d$) varies for each Start (S) location due to the geography and the road network around each Start (S) location and the distance until the various routes fork out or divide is different for each Start (S) location. Therefore, in order to determine an optimal Waypoint Distance ($W_d$), the navigation system 10 will regularly deploy the optimizing method 300 for each Start (S) location.

A determination of whether an increased Waypoint Distance ($W_d$) is needed is based on analysis of the final Destinations (D) for each of the different Waypoint (WP) locations of the Start (S) location. Factors that tend to indicate that an increased Waypoint Distance ($W_d$) is needed include: (1) high variance of final Destinations (D) for a given Waypoint (WP) location; (2) a low correlation between Waypoint (WP) location and final Destination (D); and (3) the final Destinations (D) to Waypoint (WP) location ratio is high and there are many final Destinations (D). These factors (1)-(3) are indicative of non-predictable data.

The optimizing method 300 for determining if an increase in the Waypoint Distance ($W_d$) is required commences at step 302 by retrieving from the database 16 all the final Destinations (D) and their corresponding Waypoint (WP) locations for a particular Start (S) location. Step 304 determines the number of Waypoint (WP) locations and final Destinations (D) that exist for the current Start (S) location and compares the number to a predetermined threshold value. If the number of Waypoint (WP) locations and final Destinations (D) is below the threshold value, the method 300 continues to step 306, which determines if many data points exist for the current Waypoint (WP) location. If there are not many data points for the current Waypoint (WP) location, the optimizing method 300 for the current Start (S) location ends at step 308.

At step 304, if the number of Waypoint (WP) locations and final Destinations (D) is above the threshold value, the optimizing method 300 continues to step 310. Additionally, at decision step 306, if it is determined that many data points do exist for the current Waypoint (WP) location, the optimizing method 300 continues to decision step 310. Decision step 310 determines if non-predictable data exists in any of the Waypoint (WP) locations, according to the factors (1)-(3) described above. If decision step 310 determines that non-predictable data does not exist, the optimizing method 300 ends at step 308. Conversely, if decision step 310 determines that non-predictable data does exist, the optimizing method 300 continues to step 312. Step 312 compares the currently set Waypoint Distance ($W_d$) to a predetermined maximum Waypoint Distance ($W_{d\_max}$). If the current Waypoint Distance ($W_d$) is greater than or equal to the maximum Waypoint Distance ($W_{d\_max}$), the optimizing method 300 ends at step 308. If the current Waypoint Distance ($W_d$) is less than the maximum Waypoint Distance ($W_{d\_max}$), the optimizing method 300 continues to step 314, which discards the data stored in the database 16 for the existing Waypoint (WP) locations. Step 316 increases the Waypoint Distance ($W_d$) and the optimizing method 300 for the Start (S) location ends at step 308. The optimizing method 300 continues relative to the next Start (S) location by looping back to step 302 to analyze the next Start (S) location.

Figure 9:
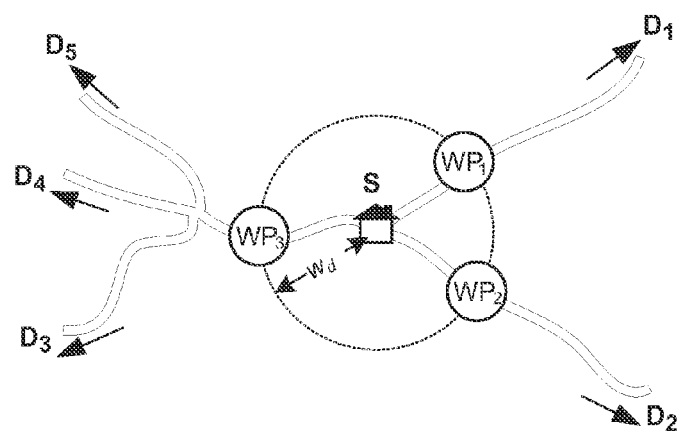
FIG. 9 is a schematic representation of a map having an exemplary location, illustrating a disparity between the number of destinations corresponding to each waypoint location.

As can be seen in the illustration of FIG. 9, in some cases the forking of the roadways can be very unevenly distributed, making the precision of the Prediction (P) vary greatly between the Waypoint (WP) locations. For example, using Waypoint Distance ($W_d$) for Waypoint locations ($WP_1$) and ($WP_2$), a very accurate Prediction (P) of final Destinations ($D_1$) and ($D_2$) can be made. Conversely, using the same Waypoint Distance ($W_d$) for Waypoint location ($WP_3$) would not yield a very accurate Prediction (P) of the final Destination ($D_{3-5}$).

Figure 10:
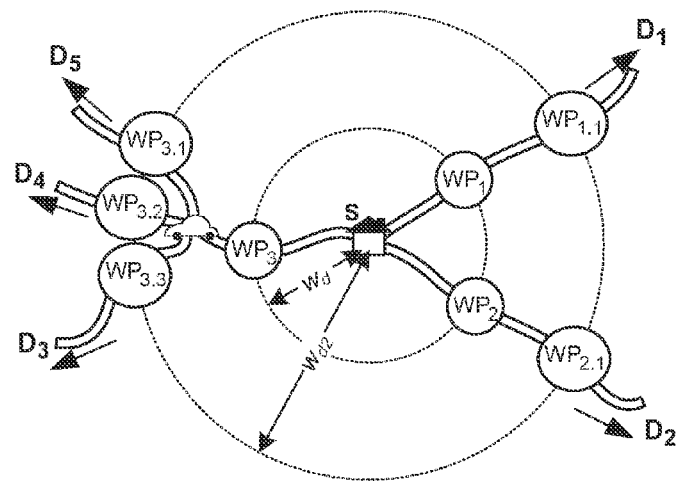
FIG. 10 is the schematic representation of a map having the exemplary location of FIG. 9, illustrating a second waypoint location located a secondary waypoint distance from the start location.
Figure 11:
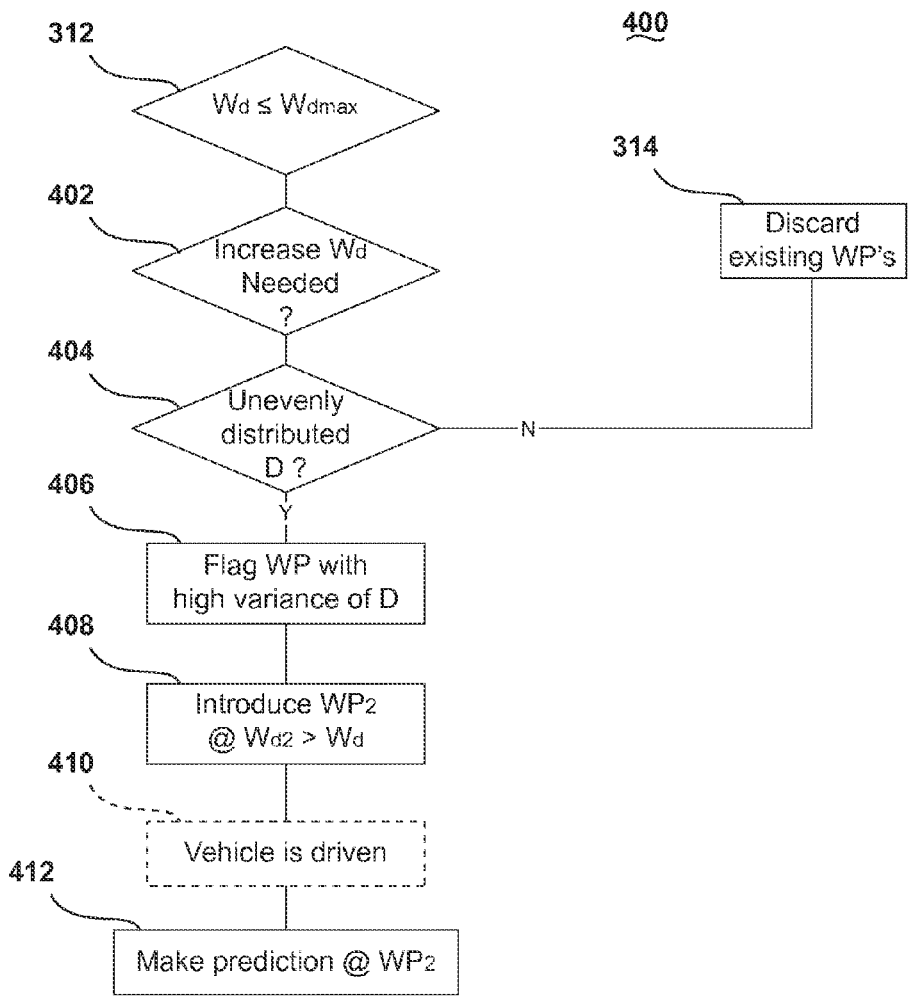
FIG. 11 is a flow diagram illustrating a method for determining the second waypoint location and distance, according to one embodiment.

Referring to FIGS. 10 and 11, a second optimizing method 400 is illustrated according to another embodiment. In certain situations, the second optimizing method 400 acts to determine a second Waypoint Distance ($W_{d2}$) so as to be able to better predict the final Destination (D). The second optimizing method 400 begins after step 312 of the optimizing method 300, after the threshold value for the number of Waypoint (WP) locations and final Destinations (D) has been determined to have been exceeded. In step 402 the navigation system 10 determines that an increase in the Waypoint Distance ($W_d$) is needed. Detection step 404 then detects the situation where one of the Waypoint (WP) locations contains a low variance of final Destinations (D), while other Waypoint (WP) locations have a high variance of final Destinations (D), meaning those Waypoint (WP) locations would benefit from an increased Waypoint Distance ($W_d$). If unevenly distributed final Destinations (D) are not detected, the method 400 ends, and control is then passed back to step 314 of the optimizing method 300.

However, if an uneven distribution of final Destinations (D) is detected in step 404, the second updating method 400 continues to step 406 by flagging that Waypoint (WP) location. A flag (F) indicates to the navigation system 10 that any prediction made for that Waypoint (WP) location is a Preliminary Prediction (PP). The method 400 continues to step 408 by introducing a secondary Waypoint ($WP_{X,Y}$) location, located a secondary Waypoint Distance ($W_{d2}$) from the Start (S) location, the new Waypoint Distance ($W_{d2}$) being greater than the original Waypoint Distance ($W_d$). The secondary Waypoint Distance ($W_{d2}$) is introduced instead of, not necessarily in addition to, increasing the Waypoint Distance ($W_d$) as described above for the optimizing method 300. The vehicle 12 is driven toward secondary Waypoint ($WP_{X,Y}$) location in step 410, and once the secondary Waypoint ($WP_{X,Y}$) location is reached, the method 400 concludes by making a Prediction (P) of the final Destination (D) based on data from the database 16 relative to the secondary Waypoint ($WP_{X,Y}$) location. The historical data for the secondary Waypoint ($WP_{X,Y}$) location includes all possible final Destinations (D) for the secondary Waypoint ($WP_{X,Y}$) location. Additionally, it should be noted that additional tiers of Waypoint (WP) locations could be added beyond the secondary Waypoint Distance ($W_{d2}$), resulting in multiple levels of Waypoint (WP) locations.

Figure 12:
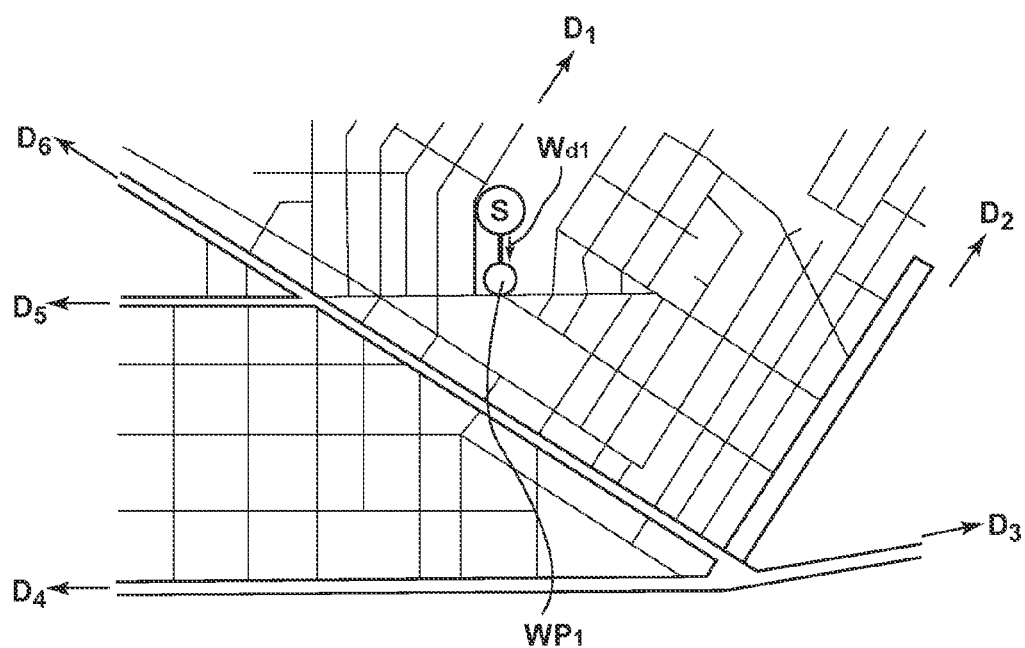
FIG. 12 is a schematic representation of a map having an exemplary location, illustrating a start location, an initial waypoint location, and a plurality of possible destinations.
Figure 13:
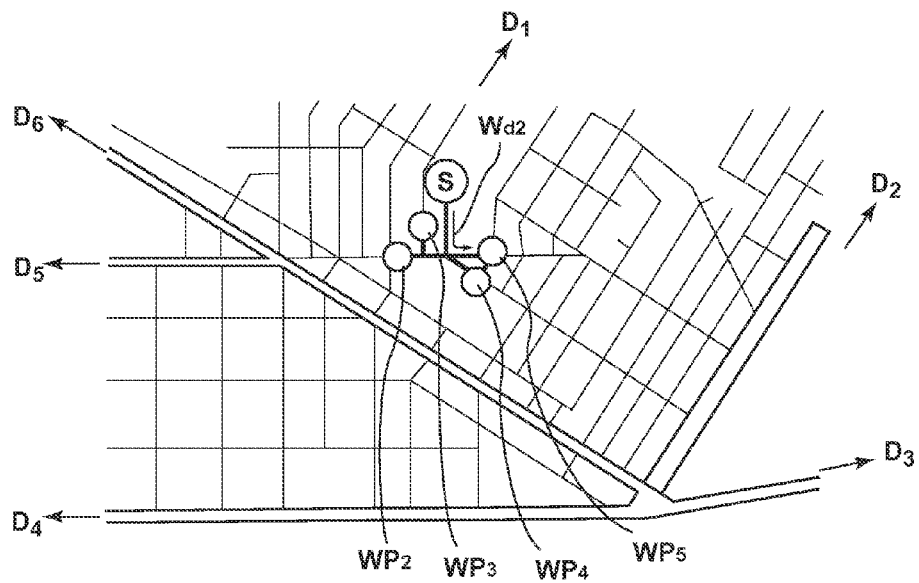
FIG. 13 is the schematic representation of a map having the exemplary location of FIG. 12, illustrating an increased number of waypoint locations located a greater distance from the start location.
Figure 14:
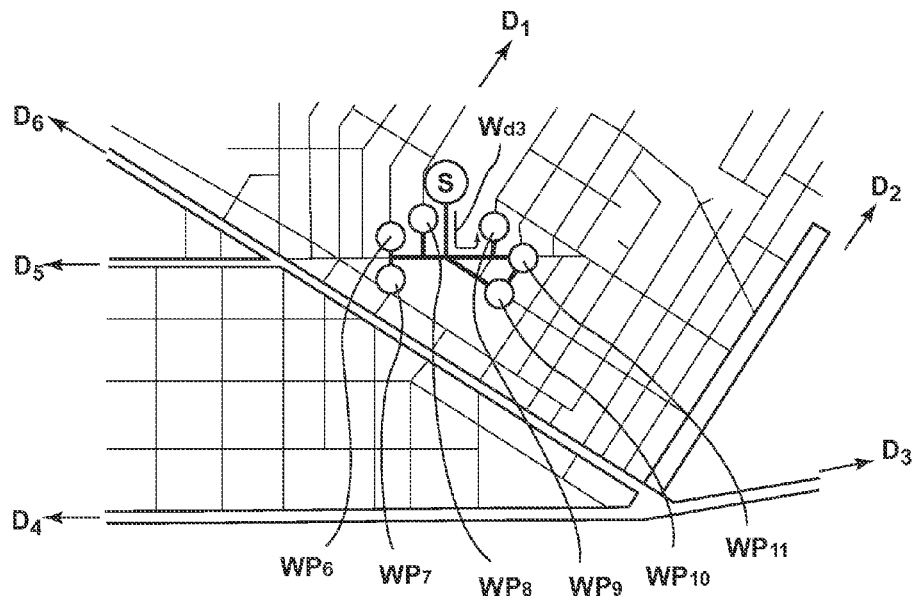
FIG. 14 is the schematic representation of a map having the exemplary location of FIG. 13, illustrating an increased number of waypoint locations located an even greater distance from the start location.

Referring to FIGS. 12-14, an example of a practical application of the navigation system 10 and methods is illustrated. In FIG. 12, Start (S) location and final Destinations ($D_{1-6}$) are shown. An initial Waypoint ($WP_1$) location is created at a default Waypoint Distance ($W_{d1}$) from the Start (S) location. As the Start (S) location is frequented more often, data is added to the database 16, and the variance of the data for Waypoint ($WP_1$) location increases. Utilizing methods 200 and 300, new Waypoint ($WP_{2-5}$) locations are created at a Waypoint Distance ($W_{d2}$), as shown in FIG. 13. The original data is replaced with new data relative to the four Waypoint ($WP_{2-5}$) locations, each with a much lower variance of final Destinations ($D_{1-6}$) than the original data. The final figure, FIG. 14, illustrates that the process is repeated once again when the variance in the individual Waypoint (WP) locations gets too large. This time, the waypoint distance is increased to Waypoint Distance ($W_{d3}$), and new Waypoint ($WP_{6-11}$) locations are created.

According to another embodiment, the navigation system 10 can be utilized for predicting a final Driven Distance (DD) to the final Destination (D), as opposed to or in addition to the location of the final Destination (D) as described above. When making the Prediction (P) for the final Driven Distance (DD), data pertaining to previously driven distances (d) is stored in the database 16 and used in making the Prediction (P) of the final Driven Distance (DD).

Figure 15:
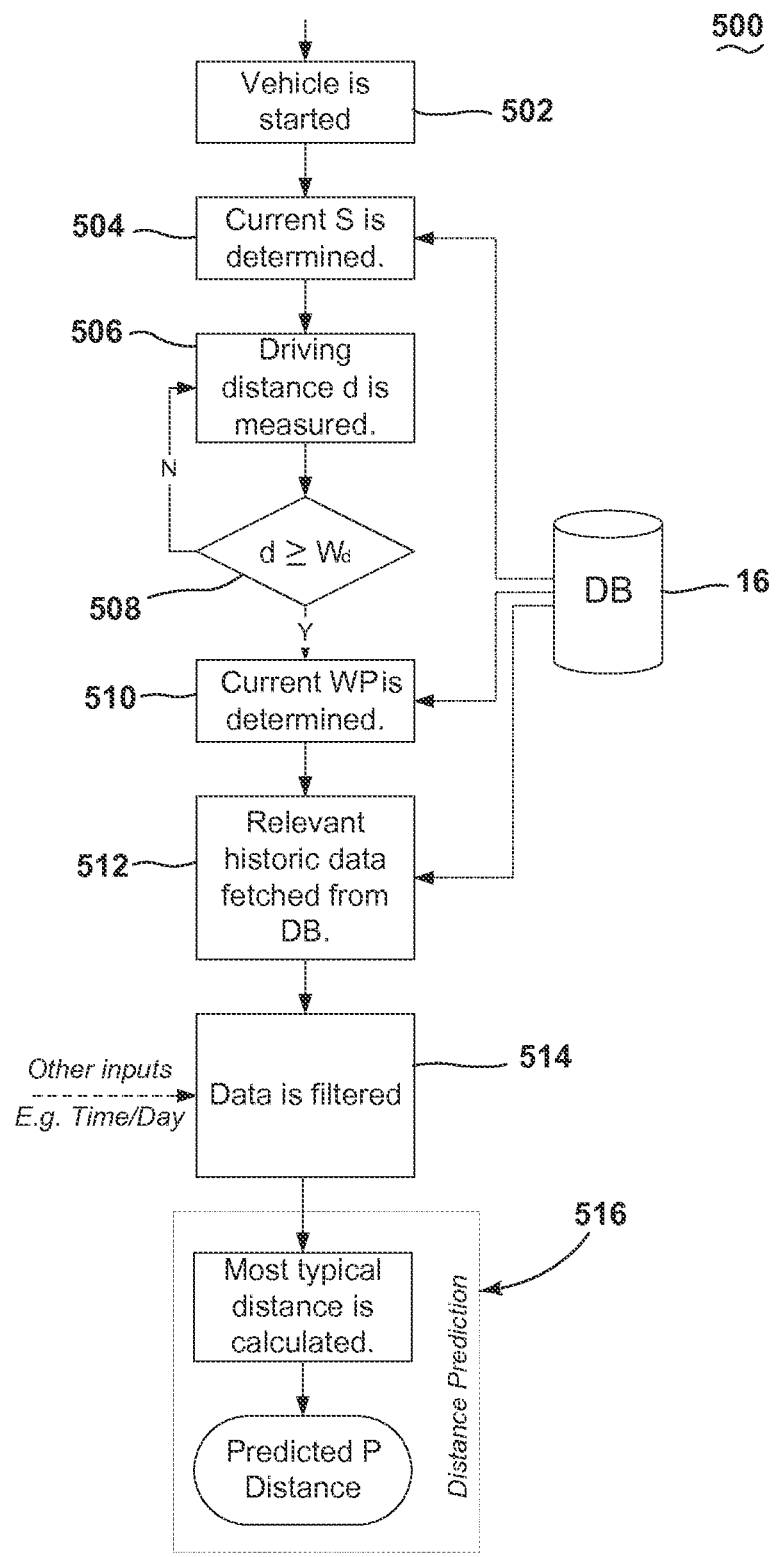
FIG. 15 is a flow diagram illustrating a method for predicting a final driven distance of the vehicle, according to one embodiment.

Referring to FIG. 15, a method 500 for predicting the final driven distance (DD) of the vehicle 12 to reach the final Destination (D) according to another embodiment is illustrated. Similar elements from the prior embodiment are labeled with like numerals, increased by 400 with it being understood that the description of the like steps of the prior embodiment apply, unless otherwise noted. The method 500 comprises the steps of acquiring the Start (S) location of the vehicle 12 from the GPS 14; providing the predetermined Waypoint Distance ($W_d$) from the Start (S) location; and determining the current Waypoint (WP) location once the vehicle 12 has traveled the predetermined Waypoint Distance ($W_d$). The method 500 continues with receiving historical Driven Distance (DD) data from a database 16, the data including previous Driven Distances (DD) associated with the current Waypoint (WP) location. Finally, the method makes the Prediction (P) at the current Waypoint (WP) location of the final Driven Distance (DD) based on the historical Driven Distance (DD) data.

One of the benefits of the navigation system 10 and methods described herein is the increased accuracy of the Prediction (P). Instead of making a prediction as soon as the vehicle 12 has been started, the Prediction (P) is delayed a certain driven distance so that a general "direction of travel" is obtained. With the introduction of the Waypoint (WP) locations, the Prediction (P) is either delayed somewhat, or a secondary, more precise Prediction (P) is introduced. Delaying the Prediction (P) reduces the number of possible final Destinations (D) and final Driven Distances (DD) to consider when the final Prediction (P) is made. Thus, the accuracy of the Prediction (P) is increased according to the navigation system 10 and methods described herein.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for predicting a final destination of a vehicle using a navigation system, the method comprising:
   acquiring a start location of the vehicle;
   providing a predetermined waypoint distance from the start location;
   determining a current waypoint location once the vehicle travels the predetermined waypoint distance;
   receiving historical data from a database, including previous destinations associated with the current waypoint location; and
   making a prediction at the current waypoint location of the final destination based on the historical data, wherein making the prediction is delayed until the predetermined waypoint distance is reached.

2. The method of claim 1, wherein the start location of the vehicle is acquired from a global positioning system device.

3. The method of claim 1, wherein for each start location, the historical data includes a plurality of possible final destinations and corresponding waypoint locations.

4. The method of claim 3, wherein when the number of possible final destinations and waypoint locations for the start location is greater than a threshold, the waypoint distance is increased and the prediction of the final destination is delayed to increase the accuracy of the prediction.

5. The method of claim 1, wherein the historical data also includes date and time information to be used for comparing to a current date and time when predicting the final destination.

6. The method of claim 1, wherein when the number of possible final destinations and waypoint locations for the start location is greater than a threshold, the method further comprises the steps of:
   providing a predetermined secondary waypoint distance from the start location; and
   determining a secondary waypoint location once the vehicle travels the secondary waypoint distance;
   wherein the secondary waypoint distance is greater than the waypoint distance.

7. The method of claim 6, wherein the historical data includes all possible final destinations for the secondary waypoint location.

8. The method of claim 7, wherein the accuracy of the prediction of the final destination is increased by utilizing the historical data for the secondary waypoint location.

9. The method of claim 1, wherein distance is measured as a straight line geometric distance.

10. The method of claim 1, wherein distance is measured as a non-linear driven distance.

11. A method for predicting a final driven distance of a vehicle to reach a final destination using a navigation system, the method comprising:
   acquiring a start location of the vehicle;
   providing a predetermined waypoint distance from the start location;
   determining a current waypoint location once the vehicle travels the predetermined waypoint distance;
   receiving historical data from a database, including previous driven distances associated with the current waypoint location; and
   making a prediction at the current waypoint location of the final driven distance based on the historical data, wherein making the prediction is delayed until the predetermined waypoint distance is reached.

12. The method of claim 11, wherein for each start location, the historical data includes the driven distance to a plurality of possible final destinations and corresponding waypoint locations.

13. The method of claim 12, wherein when the number of possible final driven distances for the current waypoint location and start location is greater than a threshold, the waypoint distance is increased and the prediction of the final driven distance is delayed to increase the accuracy of the prediction.

14. The method of claim 11, wherein the historical data also includes date and time information to be used for comparing to a current date and time when predicting the final driven distance.

15. The method of claim 11, wherein when the number of possible final driven distances for the current waypoint location and start location is greater than a threshold, the method further comprises the steps of:
   providing a predetermined secondary waypoint distance from the start location; and
   determining a secondary waypoint location once the vehicle travels the secondary waypoint distance;
   wherein the secondary waypoint distance is greater than the waypoint distance.

16. The method of claim 15, wherein the historical data includes the driven distance to all possible final destinations and corresponding secondary waypoint location.

17. The method of claim 16, wherein the accuracy of the prediction of the final driven distance is increased by utilizing the historical data for the secondary waypoint location.

18. The method of claim 11, wherein distance is measured as a straight line geometric distance.

19. The method of claim 11, wherein distance is measured as a non-linear driven distance.

20. A navigation system for predicting at least one of a final destination and a final driven distance comprising:
   a global positioning system device;
   a database for storing historical data and predetermined waypoint distance information; and
   a microprocessor in communication with the global positioning system device and the database;
   wherein the microprocessor:
      acquires a start location of the vehicle from the global positioning system device;
      acquires a predetermined waypoint distance from the database;
      determines a current waypoint location once the vehicle has traveled the predetermined waypoint distance;
      receives the historical destination and driven distance data from the database, the data includes previous destinations and driven distances associated with the current waypoint location; and
      at the current waypoint location, makes a prediction of at least one of the final destination and the final driven distance, based on the historical destination and driven distance data.

* * * * *